(12) United States Patent
Gueneau et al.

(10) Patent No.: US 12,522,365 B2
(45) Date of Patent: Jan. 13, 2026

(54) ASSEMBLY FOR AN AIRCRAFT COMPRISING A WING AND A REACTOR MAST FOR COUPLING A PROPULSION SYSTEM TO SAID WING

(71) Applicant: Airbus Operations SAS, Toulouse (FR)

(72) Inventors: Germain Gueneau, Toulouse (FR); Pierre-Antoine Combes, Toulouse (FR); Marc De Nicola, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/819,052

(22) Filed: Aug. 29, 2024

(65) Prior Publication Data
US 2025/0074610 A1    Mar. 6, 2025

(30) Foreign Application Priority Data
Aug. 31, 2023 (FR) ....................... 2309132

(51) Int. Cl.
*B64D 27/40* (2024.01)
*B64D 27/18* (2006.01)

(52) U.S. Cl.
CPC ............. *B64D 27/40* (2024.01); *B64D 27/18* (2013.01)

(58) Field of Classification Search
CPC .............................. B64D 27/40; B64D 27/402
See application file for complete search history.

(56) References Cited

U.S. PATENT DOCUMENTS

| | | | |
|---|---|---|---|
| 4,560,122 A | 12/1985 | Parkinson et al. | |
| 10,189,575 B2 | 1/2019 | Ewens et al. | |
| 10,583,930 B2* | 3/2020 | West ................. | B64C 3/32 |
| 2014/0183298 A1* | 7/2014 | Brochard ............ | B64D 27/40 |
| | | | 244/54 |
| 2016/0221682 A1 | 8/2016 | Pautis et al. | |
| 2022/0194610 A1 | 6/2022 | Tulloch et al. | |

FOREIGN PATENT DOCUMENTS

FR        3044297 A1    6/2017

OTHER PUBLICATIONS

French Search Report for corresponding French Patent Application No. 2309132 dated Feb. 13, 2024.

* cited by examiner

*Primary Examiner* — Nicholas McFall
*Assistant Examiner* — Eric Acosta
(74) *Attorney, Agent, or Firm* — Greer, Burns & Crain, Ltd.

(57) ABSTRACT

An assembly comprising a wing and a reactor mast fixed to the wing. The primary structure of the reactor mast comprises a first fixing lug and starboard and port fixing lugs, the wing carries a first fitting and starboard and port fittings, the fixing lugs being joined to the fittings with shackles having three fixing points, and the first lug being fixed to the first fitting.

9 Claims, 3 Drawing Sheets

ASSEMBLY FOR AN AIRCRAFT COMPRISING A WING AND A REACTOR MAST FOR COUPLING A PROPULSION SYSTEM TO SAID WING

CROSS-REFERENCES TO RELATED APPLICATIONS

This application claims the benefit of French Patent Application Number 2309132 filed on Aug. 31, 2023, the entire disclosure of which is incorporated herein by way of reference.

FIELD OF THE INVENTION

The present invention relates to an assembly for an aircraft comprising a wing and a reactor mast for coupling a propulsion system to the wing, as well as an aircraft comprising a propulsion system and an assembly of this kind for coupling the propulsion system to the wing.

BACKGROUND OF THE INVENTION

Typically, for an aircraft, a propulsion assembly comprises, for example, a turbojet engine which is fixed to an aircraft wing with the help of a reactor mast. The reactor mast is generally composed of a primary structure formed from a caisson made up of an upper longeron, a lower longeron and two side panels connecting the two longerons and internal ribs distributed along the caisson.

The turbojet engine is fixed beneath the reactor mast by means of engine attachments that typically comprise, at the front, a front engine attachment, at the rear, a rear engine attachment, and between the front and rear engine attachments, a thrust force absorption assembly comprising transmission rods fixed between the turbojet engine and the primary structure of the mast, to absorb the thrust forces generated by the turbojet engine.

Furthermore, the reactor mast is fixed to the wing structure with the help of fittings through which the forces coming from the turbojet engine are transmitted towards the wing structure. Although current installations are satisfactory, it is necessary to provide an implementation in which the transfer of force is improved and safety is enhanced, for example in the event of a component part of the fixing breaking.

SUMMARY OF THE INVENTION

An object of the present invention is to provide an assembly for an aircraft comprising a wing and a reactor mast for coupling a propulsion system to the wing, which comprises wing fixing means that ensure an improved transfer of forces towards the wing structure, while guaranteeing the transmission of these forces in the event of a component part of the fixing breaking.

To this end, an assembly is proposed for mounting on an aircraft a propulsion system having a vertical median plane, said assembly comprising:
a wing with a front longeron and an intrados panel fixed to a lower section of said front longeron, in which the front longeron carries a first fitting at the vertical median plane level and in which said intrados panel carries a starboard fitting and a port fitting,
a reactor mast comprising a primary structure,
a first starboard shackle fixed to said starboard fitting by a first pivot connection and a second pivot connection about an axis extending generally perpendicularly to the median plane,
a first port shackle fixed to said port fitting by a fourth pivot connection and a fifth pivot connection about an axis extending generally perpendicularly to the median plane.

A rear part of said primary structure comprises a first fixing lug extending rearwardly and at the vertical median plane level, said first fixing lug being fixed to said first fitting by a seventh connection having at least one degree of freedom in rotation about an axis extending generally parallel to the median plane.

The rear part also comprises a starboard fixing lug and a port fixing lug extending on either side and to the rear of said rear part.

Said starboard fixing lug is fixed by a third pivot connection to said first starboard shackle about an axis extending generally perpendicularly to the median plane and said port fixing lug is fixed by a sixth pivot connection to said first port shackle about an axis extending generally perpendicularly to the median plane.

Advantageously, the assembly further comprises:
a second starboard shackle extending generally parallel to said first starboard shackle, said second starboard shackle being fixed to said starboard fitting by said first connection and second connection and to said starboard fixing lug by said third connection,
a second port shackle extending generally parallel to said first port shackle, said second port shackle being fixed to said port fitting by said fourth connection and fifth connection and to said port fixing lug by said sixth connection.

Said first starboard shackle and second starboard shackle enclose said starboard fitting and said starboard fixing lug, whereas said first port shackle and second port shackle enclose said port fitting and said port fixing lug.

According to a particular aspect of the invention, each shackle comprises two plates juxtaposed and fixed to one another.

According to another particular aspect of the invention, said starboard fittings and port fittings have a generally T-shaped section with a horizontal part fixed to the lower section of said front longeron and a vertical section in which the associated pivot connections are made.

According to yet another particular aspect of the invention, each starboard and port fitting is composed of two elements having a generally Γ-shaped section and being integral with one another.

According to a particular aspect of the invention, said first fixing lug comprises two adjoining sub-lugs fixed against one another.

According to a particular aspect of the invention, the seventh connection between said first fixing lug and said first fitting comprises a main axis and a secondary axis extending coaxially and within said main axis.

According to a particular aspect of the invention, said rear section comprises a first port protrusion and a first starboard protrusion extending vertically in a plane generally perpendicular to the vertical median plane, said first protrusions being disposed on either side of said primary structure. For the first port protrusion, the assembly comprises a first rod, a first end of which is fixed to said first port protrusion by an eighth pivot connection. For the first starboard protrusion, the assembly comprises a second connection rod, a first end of which is fixed to said first starboard protrusion by a ninth pivot connection.

Said port fittings and starboard fittings comprise a second port protrusion and a second starboard protrusion, respectively, extending vertically in a plane generally perpendicular to the vertical median plane. Said second protrusions extend at the lower section of the fittings, the second starboard protrusion being fixed to a second end of said first rod by a tenth pivot connection and said second port protrusion being fixed to a second end of said second rod by an eleventh pivot connection.

According to a particular aspect of the invention, said eighth pivot connection and ninth pivot connection have a fitted connection axis and at least one of said tenth pivot connection and eleventh pivot connection has a clearance.

The invention also provides an aircraft comprising a propulsion system and an assembly as described above, in which the propulsion system is fixed to the reactor mast.

BRIEF DESCRIPTION OF THE DRAWINGS

The characteristics of the invention referred to above, as well as others, will become clearer upon reading the following description of an exemplary embodiment, said description being provided in connection with the accompanying drawings, in which.

DETAILED DESCRIPTION OF THE PREFERRED EMBODIMENTS

Figure 1:
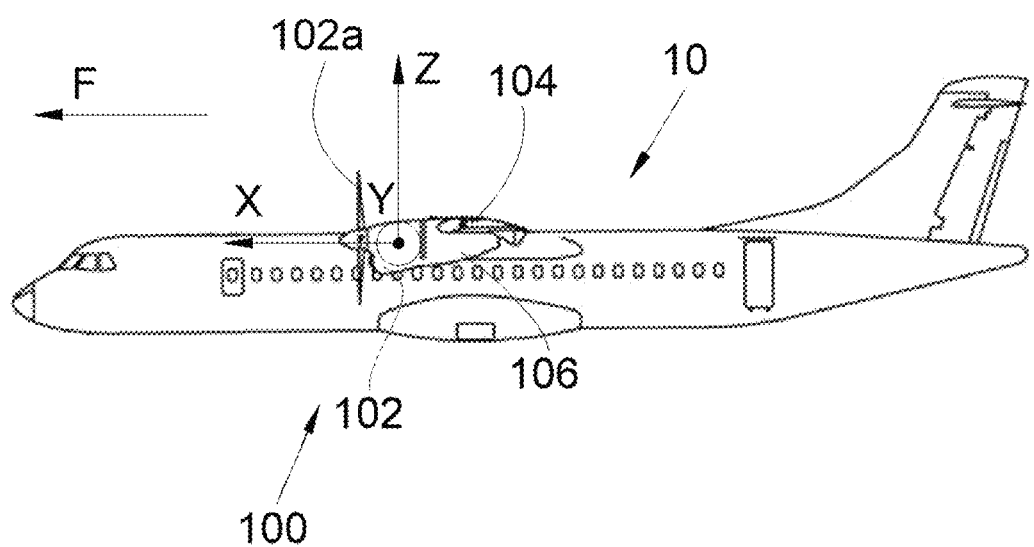
FIG. 1 is a side view of an aircraft according to the invention.

FIG. 1 shows an aircraft 10 comprising a propulsion system 102, for example, a turbojet or turboprop engine. The propulsion system 102 is connected to a wing 104 of the aircraft 10 by means of a reactor mast 106. The wing 104 and the reactor mast 106 form an assembly 100 according to the invention and the propulsion system 102 is fixed to the reactor mast 106 by any suitable fixing means known to a person skilled in the art, such as those disclosed in US 2016/0221682.

In the following description, terms related to a position are referenced to an aircraft in normal flight position, i.e. as depicted in FIG. 1, and the positions "front" and "rear" are taken in relation to the front and rear of the propulsion system 102 and with respect to the direction of travel F of the aircraft 10 when the propulsion system 102 is operational.

In the following description, and by convention, X denotes the longitudinal direction of the propulsion system, which is horizontal when the aircraft is on the ground, Y denotes the transverse direction, which is horizontal when the aircraft is on the ground, and Z denotes the vertical direction, which is vertical when the aircraft is on the ground, these three directions X, Y, and Z being orthogonal to one another.

The reactor mast 106 and the propulsion system 102 have a vertical median plane XZ and the propulsion system 102 in this case is a turboprop with a propeller 102a, but it could be of the double-flow turbojet type with a nacelle.

Figure 2:
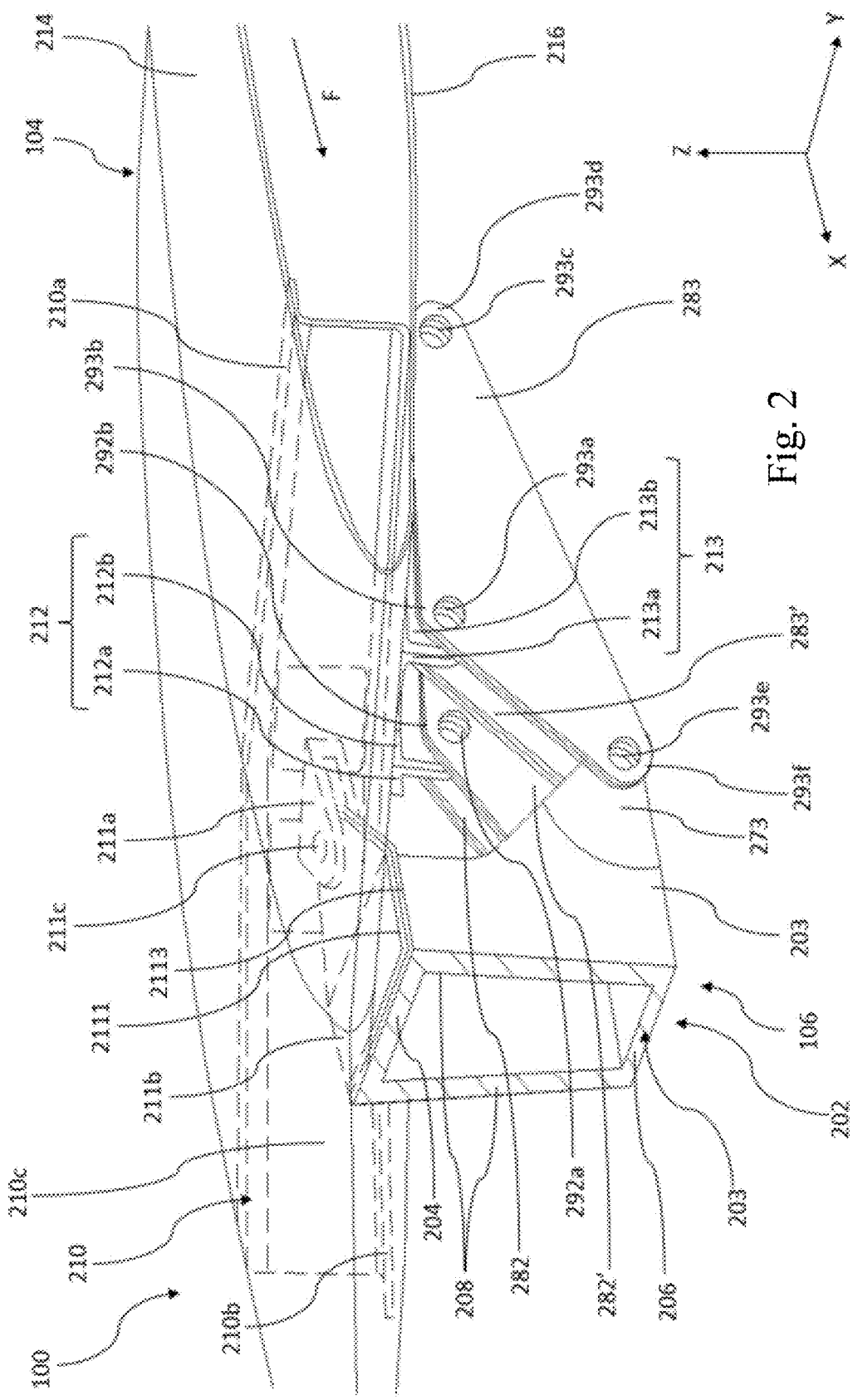
FIG. 2 is a perspective view of an assembly according to an embodiment of the invention.

FIG. 2 shows the assembly 100 according to the invention. The reactor mast 106 comprises a rigid structure forming a caisson, also referred to as the primary structure 202. The primary structure 202, illustrated here in section along a plane parallel to the ZY plane, is traditionally formed by an upper longeron 204, a lower longeron 206 and two side panels, starboard and port, connecting the two longerons 204 and 206.

The shape of the primary structure 202 is configured in this example so that the reactor mast 106 has a substantially rectangular rear section 203, located at the rear end of the reactor mast 106 in the direction of travel F.

The wing structure 104 comprises a front longeron 210, an upper surface panel 214 and a lower surface panel 216, both of which are fixed to the front longeron 210 and generally extend in the horizontal planes XY. Of course, in order to ensure the rigidity of the ring, its structure comprises other elements (not shown), such as ribs that are distributed between the upper surface panel 214 and the lower surface panel 216.

Figure 3:
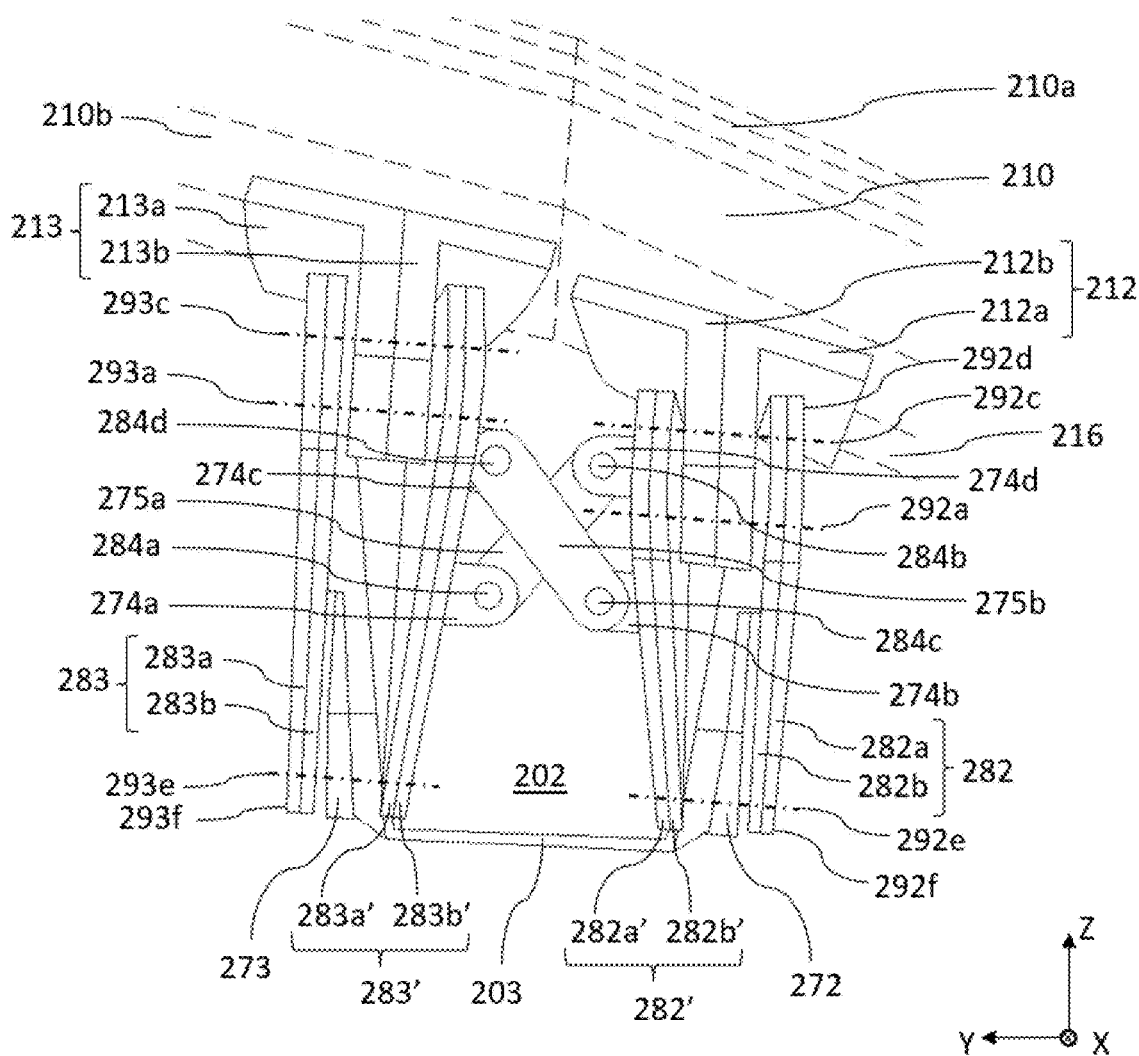
FIG. 3 is a rear view partially illustrating the assembly of FIG. 2.

The front longeron 210 in this case takes the form of a profile in the shape of an inverted Z-step in FIGS. 2 and 3, with an upper wing 210a (also referred to as a high section) and a lower wing 210b (also referred to a low section) which are generally horizontal, and a central section 210c generally (i.e., +/−10%) perpendicular to the median plane and extending generally vertically parallel to the plane YZ. The upper surface panel 214 is fixed above the upper wing 210a of the longeron 210 and the lower surface panel 216 is fixed below the lower wing 210b of the longeron 210. The fixing of the front longeron 210 to the panels 214 and 216 is achieved by any suitable means, such as welds, bolts, etc. The upper surface panel 214 is thereby fixed to the upper section of the front longeron 210 and the lower surface panel 216 is fixed to the lower section of the front longeron 210. The central section 210c is at the level of the leading edge of the wing.

In order to allow the fixing of the reactor mast 106 to the wing 104, the front longeron 210 carries a first fitting 211a, referred to as a central fitting, fixed at the level of the vertical median plane XZ and, more particularly in this case, at the central section 210c of the front longeron 210. The lower surface panel 216 carries a starboard fitting 212 and a port fitting 213 that are fixed on the external face of the lower surface panel 216. In this example, the starboard fittings 212 and the port fittings 213 are fixed at the level, which is generally in vertical alignment, of the lower section 210b of the front longeron 210.

The assembly 100 comprises a first starboard shackle 282 fixed to the starboard fitting 212 by a first pivot connection 292a and a second pivot connection 292c, whereof the rotational axis is generally horizontal. More precisely, the axes of the connections 292a and 292c extend generally perpendicularly to the median plane XZ. The assembly also comprises a first port shackle 283 fixed to the port fitting 213 by a fourth pivot connection 293a and a fifth pivot connection 293c about an axis, whereof the rotational axis is generally horizontal. More precisely, the axes of the connections 293a and 293c extend generally perpendicularly to the median plane (XZ).

In order to allow the fixing of the reactor mast 106 to the wing 104, the rear section 203 of the primary structure 202 comprises a first fixing lug 211b that extends to the rear and at the level of the vertical median plane XZ. More precisely, the first fixing lug 211b extends at the top of the rear section 203 and is located opposite the first fitting 211a. The first fixing lug 211b is fixed to the first fitting 211a by a seventh connection 211c having at least one degree of freedom in rotation about a vertical axis extending parallel to the vertical axis Z. The seventh connection 211c may be in the form of a pivot connection or a pivot-sliding connection. In the embodiment of the invention presented here, the first fitting 211a takes the form of a female lug and the first fixing lug 211b takes the form of a male lug inserted into the female lug.

This fixing point between the reactor mast 106 and the wing 104 absorbs the axial forces along the X axis and the lateral forces along the Y axis. This fixing point also absorbs the moment about the Y axis.

The rear section 203 also comprises a starboard fixing lug 272 and a port fixing lug 273 that extend to the rear of the rear section 203. More particularly in this case, the starboard fixing lugs 272 and the port fixing lugs 273 extend in the lower section and on either side of said rear section 203.

The starboard fixing lug 272 is fixed by a third pivot connection 292e to the starboard shackle 282 about a generally horizontal axis and the port fixing lug 273 is fixed by a sixth pivot connection 293e to the port shackle 283 about a horizontal axis. More precisely, the axes of the third and sixth pivot connections 292e and 293e extend generally perpendicularly to the median plane XZ, that is to say, generally parallel to the transverse axis Y. The axes of connections 292e and 293e may, moreover, extend generally coaxially.

Hence, the two fixing points of the starboard fixing lug 272 and the port fixing lug 273 located on either side of the lower longeron 206 of the primary structure 202 are connected to the starboard fitting 212 and the port fitting 213 integral with the wing 104 by two first starboard shackles 282 and port shackles 283 having three fixing points (namely the associated pivot connections described above). In this way, the transmission of forces coming from the propulsion system 102 and passing through the reactor mast 106 towards the wing 104 is optimized. More precisely, these different fixing points of the reactor mast 106 to the wing 104 ensure the transfer of vertical forces (along the Z axis) and axial forces (along the X axis). These fixing points also absorb moments about the X and Z axes. This particular implementation also allows the paths taken by the forces through the reactor mast 106 towards the wing 104 to be precisely determined.

In this example, the first starboard shackle 282 and the first port shackle 283, the starboard lugs 272 and the port lugs 273 and the starboard fittings 212 and the port fittings 213 each have a bore into which an axis is inserted, in order to form the pivot connections 292a, 292c, 292e and 293a, 293c, 293e.

In this example, the first starboard shackle 282 and the first port shackle 283 have a generally triangular shape. Hence, the first pivot connection 292a and the second pivot connection 292c are arranged in a first high corner 292b and a second high corner 292d of the first starboard shackle, respectively, and the third pivot connection 292e is arranged in a third low corner 292f of the first starboard shackle 282. Similarly, the fourth pivot connection 293a and the fifth pivot connection 293c are arranged in a fourth high corner 293b and a fifth high corner 293d, respectively, of the first port shackle 283 and the sixth pivot connection 293e is arranged in a sixth low corner 293f of the first port shackle 283.

The implementation of triangular shackles notably allows the assembly 100 to be compatible with the use of an aerodynamically shaped fairing covering at least part of the reactor mast 106.

According to this embodiment of the invention, the assembly 100 comprises a second starboard shackle 282' which extends generally parallel to the first starboard shackle 282 and which is fixed to the starboard fitting 212 by the first connection 292a and the second connection 292c and to the starboard fixing plate by the third connection 292e. Similarly, the assembly 100 comprises a second port shackle 283' which extends generally parallel to the first port shackle 283 and which is fixed to the port fitting 213 by the fourth 293a connection and the fifth 293c connection and to the port fixing plate 273 by said sixth connection 293e. In addition, the first starboard shackle 282 and the second starboard shackle 282' enclose the starboard fitting 212 and the starboard fixing lug 272, whereas the first port shackle 283 and the second port shackle 283' enclose the port fitting 213 and the port fixing plate 273.

Hence, each starboard fitting 212 and port fitting 213 is connected to the starboard fixing lug 272 and to the port fixing lug 273, respectively, by two shackles 282, 282' and 283, 283', respectively.

The doubling of the starboard and port shackles allows the paths taken by the forces passing from the propulsion system 102 towards the wing 104 to be multiplied. This also allows a continuity of force transfers to be ensured in the event that one of the shackles or a fixing point of these shackles at the level of the reactor mast 106 or the wing 104 should rupture.

In this example, the first and second starboard shackles 282 and 282' are generally identical. The same applies to the first and second port shackles 283 and 283'. However, it is conceivable for different shapes to be provided for the first and second shackles.

According to this embodiment, each shackle 282, 282', 283, 283' comprises two plates 282a, 282a', 282b, 282b', 283a, 283a', 283b, 283b' juxtaposed and fixed against one another. More particularly, the first starboard shackle 282 comprises two plates 282a and 282b, the second starboard shackle 282' comprises two plates 282a' and 282b', the first port shackle 283 comprises two plates 283a and 283b and the second port shackle 283' comprises two plates 283a' and 283b'. Preferably, the plates of each shackle are identical.

The implementation of two plates juxtaposed and fixed to one another to form each shackle allows the paths taken by the forces crossing the propulsion system 102 towards the wing 104 to be multiplied and allows a continuity of force transfers to be ensured in the event that one of the plates of each shackle or a fixing point of these plates should rupture. According to this embodiment, the starboard fittings 212 and the port fittings 213 have a generally T-shaped section with a horizontal section fixed to the lower section 210b of the front longeron 210 and a vertical section in which the associated pivot connections are made. More specifically, the vertical section of the starboard fitting 212 comprises two bores in which axes are inserted to form the first connection 292a and the second connection 292c, respectively.

Similarly, the vertical section of the port fitting 213 comprises two bores in which axes are inserted to form the fourth connection 293a and the fifth connection 293c, respectively.

Preferably, each starboard fitting 212 and each port fitting 213 is made up of two elements, 212a, 212b and 213a, 213b, respectively, having a generally Γ-shaped section. The two elements of each fitting are integral with one another. Specifically, the two elements of each fitting are secured to each other by the vertical sections of the Γ which together form the vertical section of the T of the fitting, whereas the horizontal sections of these Γ-shaped elements are arranged opposite one another and together form the horizontal section of the T of the fitting.

The implementation of two elements fixed to one another to form each fitting allows the paths taken by the forces passing from the propulsion system 102 towards the wing 104 to be multiplied and ensures a continuity of force transfers in the event that one of the elements of each fitting should rupture.

According to this embodiment, the first fixing lug 211b comprises two sub-plates 2111 and 2113 juxtaposed and fixed against one another. In this example, the two sub-plates 2111 and 2113 are identical. The implementation of two sub-plates 2111 and 2113 fixed to one another to form the first fixing plate 221b allows the paths taken by the forces passing from the propulsion system 102 towards the wing 104 to be multiplied and ensures a continuity of force transfers in the event that one of the sub-plates of the first fixing lug 211b should rupture.

According to this embodiment, the seventh connection 211c between the first fixing lug 211b and the first fitting 211a comprises a main axis (not illustrated) and a secondary axis (not illustrated) coaxially extending within the main axis. In this example, the main axis and the secondary axis extend parallel to the vertical axis Z.

More specifically, the first fitting 211a and the first fixing lug 211b each have a bore in which the main axis is inserted to form the seventh pivot connection 211c. The secondary axis is inserted into the main axis so as to ensure a continuity of force transfers in event that the main axis should rupture.

As shown in FIG. 3, which partially represents the assembly in a rear view, the assembly 100 further comprises a set of two rods 275a, 275b making it possible to react to the forces coming from the propulsion system 102 and which could generate an oscillatory movement on the reactor mast 106. In this example, the rear section 203 of the primary structure 202 comprises a first port protrusion 274a and a first starboard protrusion 274b. In this example, each first protrusion 274a, 274b has an ear-like shape and extends vertically and perpendicularly to the side walls 208 of the primary structure 202, in other words, in a perpendicular plane to the vertical median plane XZ. More specifically, the first protrusions 274a and 274b in this case generally extend to half the height of their respective side wall 208.

The port fitting 213 and the starboard fitting 212, respectively, carry a second port protrusion 274c and a second starboard protrusion 274d. In this example, each second protrusion 274c, 274d also has an ear-like shape and extends vertically in a plane perpendicular to the vertical median plane XZ. In this example, the second protrusions 274c, 274d extend on the vertical section of the T of each fitting.

In this example, the first protrusions 274a and 274b are opposite one another. Similarly, the second protrusions 274c and 274d are also opposite one another. The set of rods 275a, 275b connects the fittings 212 and 213 to the rear section 203 of the primary structure 202 in a crosswise manner. More specifically, a first rod 275a connects the first port protrusion 274a to the second starboard protrusion 274d, whereas the second rod 275b connects the first starboard protrusion 274b to the second port protrusion 274c. The first rod 275a and the second rod 275b are therefore crossed and extend substantially in two parallel planes perpendicularly to the vertical median plane XZ. The two parallel planes are slightly spaced apart to facilitate the crossing of the first rod 275a and the second rod 275b.

The ends of the first rod 275a are joined to the first port protrusion 274a and to the second starboard protrusion 274d, respectively, by an eighth pivot connection 284a and a ninth pivot connection 284b. The ends of the second rod 275b are joined to the first starboard protrusion 274b and to the second port protrusion 274c, respectively, by a tenth pivot connection 284c and an eleventh pivot connection 284d.

Optionally, the first rod 275a is referred to as "engaged", whereas the second rod 275b is referred to as "on standby". This means that the connection axes of the eighth pivot connection 284a and the ninth pivot connection 284b are adjusted and therefore react to the forces under stress, so that the first rod 275a represents the so-called "main" force path for the transmission of forces, having a component oriented substantially transversely along the Y direction. At least one of the tenth pivot connection 284c and the eleventh 284d pivot connection has a clearance that allows, in the event that the first rod 275a should rupture, the engagement of the second rod 275b, so that it is the second rod 275b that reacts to the forces.

The second rod 275b therefore represents the so-called "secondary" force path. For example, the tenth pivot connection 284c and the eleventh pivot connection 284d each have a connection axis carried respectively by the first starboard protrusion 274b and by the second port protrusion 274c. At least one of the bores made at the ends of the second rod 275b and cooperating with these connection axes has, for example, an oblong shape, so that the second rod 275b is mounted with a clearance at least at the level of one of the tenth pivot connection 284c and the eleventh 284d pivot connection.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly for mounting on an aircraft a propulsion system having a vertical median plane, said assembly comprising:
    a wing with a front longeron and an intrados panel fixed to a lower section of said front longeron, wherein the front longeron carries a first fitting at the vertical median plane level and wherein said intrados panel carries a starboard fitting and a port fitting,
    a reactor mast comprising a primary structure,
    a first starboard shackle fixed to said starboard fitting by a first pivot connection and a second pivot connection about an axis extending generally perpendicularly to the median plane,
    a first port shackle fixed to said port fitting by a fourth pivot connection and a fifth pivot connection about an axis extending generally perpendicularly to the median plane,
    a rear part of said primary structure comprising a first fixing lug extending rearwardly and at the vertical median plane level, said first fixing lug fixed to said first fitting by a seventh connection having at least one degree of freedom in rotation about a vertical axis, said rear part further comprising a starboard fixing lug and a port fixing lug extending on either side and to a rear of said rear part, wherein said starboard fixing lug is fixed by a third pivot connection to said first starboard shackle about an axis extending generally perpendicularly to the median plane, and wherein said port fixing lug is fixed by a sixth pivot connection to said first port shackle about an axis extending generally perpendicularly to the median plane, wherein said rear section comprises a first port protrusion and a first starboard protrusion extending vertically in a plane generally perpendicular to the vertical median plane, said first protrusions disposed on either side of said primary structure, for the first port protrusion, the assembly comprises a first rod, a first end of which is fixed to said first port protrusion by an eighth pivot connection, for the first starboard protrusion, the assembly comprises a second rod, a first end of which is fixed to said first starboard protrusion by a ninth pivot connection, and wherein port fittings and starboard fittings comprise a second port protrusion and a second starboard protrusion, respectively, extending vertically in a plane generally perpendicular to the vertical median plane, said second protrusions extending at the lower section of the fittings, the second starboard protrusion fixed to a second end of said first rod by a tenth pivot connection and said second port protrusion fixed to a second end of said second rod by an eleventh pivot connection.

2. The assembly according to claim 1, further comprising:

a second starboard shackle extending generally parallel to said first starboard shackle, said second starboard shackle fixed to said starboard fitting by said first connection and second connection and to said starboard fixing lug by said third connection, a second port shackle extending generally parallel to said first port shackle, said second port shackle fixed to said port fitting by said fourth connection and fifth connection and to said port fixing lug by said sixth connection, wherein said first starboard shackle and second starboard shackle enclose said starboard fitting and said starboard fixing lug, and wherein said first port shackle and second port shackle enclose said port fitting and said port fixing lug.

3. The assembly according to claim 2, wherein each shackle comprises two plates juxtaposed and fixed to one another.

4. The assembly according to claim 1, wherein said starboard fitting and port fitting have a generally T-shaped section, respectively, with a horizontal part fixed to the lower section of said front longeron and a vertical section wherein the associated pivot connections are made.

5. The assembly according to claim 4, wherein each starboard fitting and each port fitting is made up of two elements having a generally T-shaped section, respectively, and integral with one another.

6. The assembly according to claim 1, wherein said first fixing lug comprises two sub-plates juxtaposed and fixed against one another.

7. The assembly according to claim 1, wherein the seventh connection between said first fixing lug and said first fitting comprises a main axis and a secondary axis extending coaxially and within said main axis.

8. The assembly according to claim 1, wherein said eighth pivot connection and ninth pivot connection have a fitted connection axis and wherein at least one of said tenth pivot connection and eleventh pivot connection has a clearance.

9. An aircraft comprising:
a propulsion system, and
the assembly according to claim 1, wherein the propulsion system is fixed to the reactor mast.

* * * * *